United States Patent [19]

Roetling

[11] 4,308,553
[45] Dec. 29, 1981

[54] METHOD AND APPARATUS FOR MAKING MONOCHROME FACSIMILES OF COLOR IMAGES ON COLOR DISPLAYS

[75] Inventor: Paul G. Roetling, Ontario, N.Y.

[73] Assignee: Xerox Corporation, Stamford, Conn.

[21] Appl. No.: 126,801

[22] Filed: Mar. 3, 1980

[51] Int. Cl.³ .............................................. H04N 1/46
[52] U.S. Cl. ........................................................ 358/75
[58] Field of Search ..................... 358/75, 80, 81, 21, 358/22; 364/521; 340/730

[56] References Cited

U.S. PATENT DOCUMENTS

| | | | |
|---|---|---|---|
| 4,110,826 | 8/1978 | Mollgaard et al. | 358/75 X |
| 4,149,183 | 4/1979 | Pellar et al. | 358/75 |

*Primary Examiner*—Robert L. Richardson
*Attorney, Agent, or Firm*—John E. Beck; Michael H. Shanahan; Ronald F. Chapuran

[57] ABSTRACT

Method and apparatus are disclosed for making 35 mm color slides from a color image created on a color cathode ray tube (CRT) terminal. The color terminal transmits commands to a remote central processing unit (CPU) that in turn operates a 35 mm camera device to expose 35 mm color slide film. Prior to transmitting the commands, a black on white facsimile of the color image is created by a graphic printer located at the color terminal. The black and white facsimile uses different halftone dot patterns in a monochrome graphic image to simulate the different colors created at the color terminal. The halftone dot pattern density is related to the luminance of the color it represents and the scale of the dot pattern is large to enable ready detection by the human eye. Also, different dot patterns are used for different colors and on edge enhancement technique is used to distinguish one simulated color region from another in the monochrome image.

18 Claims, 10 Drawing Figures

METHOD AND APPARATUS FOR MAKING MONOCHROME FACSIMILES OF COLOR IMAGES ON COLOR DISPLAYS

BACKGROUND

This invention relates to electronic image processing method and apparatus. In particular, this invention relates to conversion of electrical images suitable for display on a color raster scan cathode ray tube (CRT) or other display devices to a format suited for reproduction as marks on paper or other permanent support.

Color, raster scan computer terminals are marketed by several companies. IBM recently announced its Model 3279 while other marketers of color raster scan CRT terminals include Tektronix, Ramtek Corporation, Aydin Corporation, Intelligent Systems Corporation, Industrial Data Terminals Corporation, Lexidata and Chromatics Corporations. The raster scan color CRT is well suited for displaying graphs and charts for businessmen and is also suited for many engineering and scientific applications.

The color images created on a raster scan CRT are convertible to color graphics by appropriately interfacing the green, red and blue digital representations of an image stored in the memory of a color terminal to a devices such as the Xerox 6500 Color Graphic Printer (CGP) and the CELCO CFR 2000. The 6500 CGP is a xerographic machine having a laser scanning system. Magenta, cyan and yellow toner images are sequentially generated from green, red and blue digital images by modulating a laser scanning spot writing on a charged selenium photoreceptor. The magenta, cyan and yellow toner images are sequentially transferred in registration to the same side of the same support member, e.g. plain paper, to create the color reproduction of the color image at the CRT terminal.

The CELCO CFR 2000 is a photographic device. The green, red and blue digital images in the terminal are applied to a precision CRT to create an image that is projected onto 35 mm color slide film through green red and blue transmission filters sequentially.

The color copy made by the 6500 CGP and 35 mm color slide made by the CELCO CFR 2000 are high quality color reproductions. These reproductions, however, are not always essential to the needs of a particular user of a color CRT terminal. In particular, if there is an error in content made by the terminal operator the resultant color product may be useless. In such cases, the expense and time associated with creating the color reproductions are not warranted.

SUMMARY

Accordingly, it is a main object of this invention to make a graphic reproduction of a color terminal image more cost effectively than presently available methods and apparatus.

Specifically, it is an object of this invention to make a monochrome reproduction of a polychrome electrical image without sacrificing the luminance and color identity of the polychrome image.

It is also an object of this invention to enhance the edges or transitions between different colors in a monochrome reproduction of a polychrome electrical image.

Consistent with the foregoing objects, it is also an object to represent color in a monochrome reproduction with halftone dots whose densities (or inversely, luminance) are related to the luminance of colors and whose patterns are adequate to identify different colors.

Another object of the invention is to employ a halftone dot screen generator capable of producing screens at various angles as the means for representing different colors in a monochrome image with different dot patterns.

The foregoing and other objects of the invention are achieved by using a monochrome reprographic device to simulate a color image created with a color raster scan CRT terminal. Hereinafter, the single color facsimile is discussed in terms of black marks on white paper but other monochrome color schemes are acceptable. One suitable reprographic device is an electrostatic printer of the type such as the Versatec 1200 Printer Plotter marketed by the Versatec Corporation of Cupertino, California.

A black on white image created on an electrostatic printer according to the present invention is a valuable facsimile of the color CRT because it preserves the luminance of the colors in the CRT image as well as providing a distinct pattern to distinguish one CRT color from another. Furthermore, an edge enhanced technique is used to enable the eye to detect the separation between the various colors which is meaningful when the luminance levels of two CRT colors are close to each other and these two CRT colors are reproduced next to each other on the reproduction or copy.

Luminance and pattern information are both available in the facsimile because different density half tone dots are used for the different CRT colors. The halftone dot density for the color black is the highest and for white is the lowest. Between black and white, the densities are empirically selected to correspond to the colors being simulated. For example, a nine pixel halftone dot has all pixels set to black for black and all pixels set to white for white. Blue is represented by a pattern that sets 7 of the 9 pixels elements within a halftone dot to black and 2 to white. The halftone dots representing red and green have, respectively, six and five pixels set to black. Magenta, cyan and yellow are combinations of two of the three patterns and have respectively four, three and two black pixels within the halftone dot.

The density of the halftone dot is representative of the comparative luminance of the CRT colors. In addition, the scale of the halftone dots is made large enough for ease of recognition by the eye with the patterns selected for the different color being readily distinguishable from each other. In other words, the halftone dot frequency is deliberately selected to fall into the region clearly detectable by the human eye. The detectable pattern associated with the halftone is another means for identifying a particular color. Conventionally, in graphics halftone dot frequencies are given frequencies above the level at which the human eye can perceive them.

The edges between simulated colors are enhanced by making the darker side black and the lighter side white. This is most useful when the color CRT image is enlarged or magnified before being reproduced. The magnified image offers redundant bits or pixels that are set to white or black at an edge (transition between two colors) without suffering any meaningful loss of image information.

PRIOR ART STATEMENT

There is no known prior art system that generates black on white graphic reproductions that are faithful facsimiles of a color CRT image. Conventionally, color graphics and not monochrome grahics are made of color CRT images when graphics are desired.

A black and white Polaroid instant film photograph of a color CRT display is not a relevant prior art. The Polaroid picture will capture density variations in the color CRT image but the natural density variations between colors are not likely to provide satisfactory means for identifying colors. Furthermore, the Polaroid picture does not have unique patterns associated with each color to help the eye discriminate between colors. More to the point, the Polariod camera is a continuous tone optical device that operates on the image created on the color CRT screen and not the electrical signals or data that represent the image as found with this invention.

The black on white copy made of a color original placed on the platen of a xerographic black on white copying machine is also not relevant to the present invention. The xerographic process is able to reproduce the tonal variations found in at least screened color originals but the copy, like the Polaroid film print, does not include patterns that help identify various colors within the original. Also, the conversion process is optical in comparison to the electrical process of image simulation used herein.

Monochrome facsimile systems also lack relevancy. In such systems, a monochrome electrical image of a color original placed in the scanner in a facsimile transmitter is generated. A monochrome reproduction is made at a receiver from the transmitted electrical image but the image doesn't conform in luminance and pattern as taught by the invention here. The commercial luminance signals generated in the U.S.A. standard broadcast format is a black and white facsimile of a color original. A black and white TV receiver uses the luminescent signal to create a continuous tone image on a display and not a graphic reproduction as with this invention. Also, there are no patterns or other means or steps to identify colors.

THE DRAWINGS

Other objects and features of the present invention are apparent from the specification and the drawings taken alone and together. The drawings are:

FIG. 3b is a layout of three 6×6 halftone dot patterns that are the same as the green, red and blue halftone patterns in FIG. 3a but with four identical bits replacing the original bits in the patterns of FIG. 3a.

DETAILED DESCRIPTION

Figure 1:
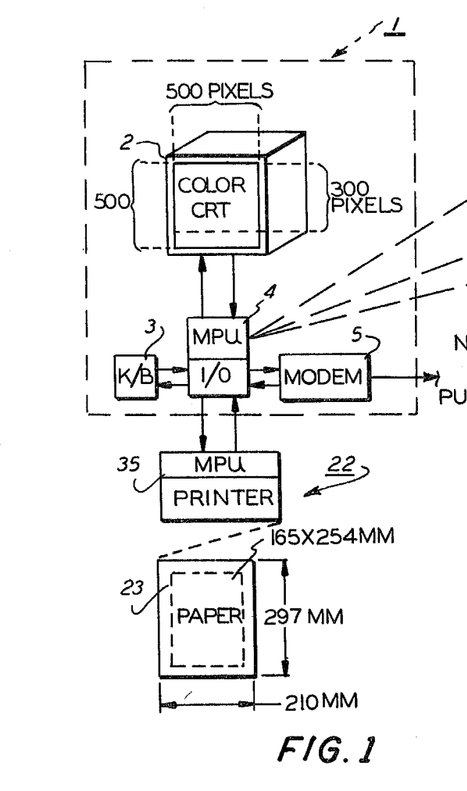
FIG. 1 is a schematic drawing of a system for generating 35 mm color slides of a digital, color, CRT image. The system includes a monochrome printer coupled to a color CRT terminal for creation of a black on white facsimile of a color image at the terminal.
Figure 2:
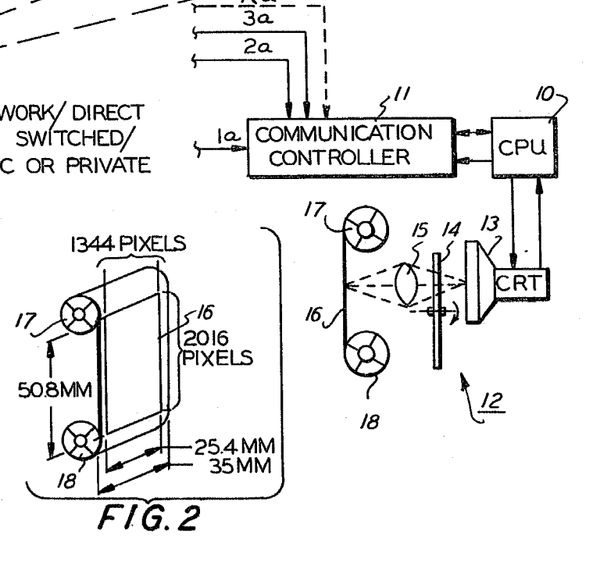
FIG. 2 is an isometric view of the 35 mm slide film of FIG. 1 with an image area on the film outlined and dimensioned.

The present invention is useful for generating black on white proof prints of color images generated on electronic display devices such as a color CRT terminal or a color gas panel display device. The 35 mm color slide making system of FIG. 1 is illustrative of a system using a color CRT display. The system of FIG. 1 is described in detail in U.S. Pat. No. 4,181,955, the disclosure of which is hereby expressly incorporated by reference. The object of the system is to generate 35 mm color slides suitable for business presentation and business or technical seminars. The cost of generating a 35 mm color slide with the system of FIG. 1 is competitive but not inconsequential. Consequently, a monochrome, e.g. a black on white, proof print of a color slide is a time saving, cost effective addition to the 35 mm slide making system provided it does not unduly add to the overall cost per color slide. The present invention meets that test by way of a novel and non-obvious method and apparatus for simulating an electronic color image (the CRT image) represented by color signals with a black on white electronic image (for the proof printer) represented by marking signals.

The 35 mm slide system includes the CRT color display terminal 1 in turn made up of a CRT display device 2, a keyboard 3, a microprocessor unit (MPU) 4 and the modem 5. An operator manipulates the keyboard to execute prescribed codes that enable various charts and graphs to be created in color on the face of the CRT. The keyboard manipulations cause digital signals or bit patterns representative of color and shape to be generated and stored in the MPU memory. The circles 7, 8 and 9 schematically represent three separate storage areas within MPU memory that contain the image bit patterns, i.e. the color signals.

The face of the CRT 2 is made up of a plurality of small areas each including regions of green, red and blue light emitting phosphors. These small areas are referred to as color pixels. The CRT has three electron guns that are able to address each color pixel. When no electron gun is aimed at a given color pixel, the pixel is said to be black and when all three guns are aimed at the pixel the green, red and blue regions emit radiation that together is close to white light. Six other colors besides black and white are available by selectively energizing one or more of the green, red and blue regions within a color pixel: yellow, cyan, magenta, green, red and blue.

A set of green, red and blue color signals are stored in the separate MPU memory regions 7, 8 and 9 and are applied to the three electron guns in the CRT in a raster scan fashion. A convenient raster pattern is simply one including a plurality of color pixels aligned in a row across the width of the screen and the rows are repeated down the height or length of the screen. The addressing of the color pixels by the three CRT guns is sequential and occurs row by row thereby creating a color raster image. The color signals are fixed in their storage locations 7, 8 and 9 until the operator through the keyboard makes a change or clears the memory. However, the phosphors on the CRT face need to be re-energized or refreshed repeatedly to sustain their color light emissions. The MPU 4 includes conventional means for refreshing the display. The present invention operates on the stored color signals independently of the image repeatedly being sustained by the same data in the green, red and blue memories 7, 8 and 9.

The color image created at the CRT terminal 1 is transmitted over an appropriate communication link to a central processor unit (CPU) 10 located at a central location. The modem 5 enables the terminal to interface with the communication link or network. A communication controller 11 is adapted to receive information from a plurality of color terminals like terminal 1 as represented by the lines 1a, 2a, 3a and na. Line 1a is connected to terminal 1. As explained in the above U.S. Pat. No. 4,181,955, the keyboard commands used to create the green, red and blue color signals in memories 7, 8 and 9 are transmitted to the CPU rather than the color signals themselves to achieve a significant data compression.

The CPU 10 recreates from the transmitted commands the green, red and blue signals stored in memories 7, 8 and 9 but does so at a much higher resolution suited for the exposure of the 35 mm color slide film. The color signals stored in memories 7, 8 and 9 are binary numbers. A binary one in the green memory results in electrons impinging on a green phosphor region of a particular color pixel. A binary zero keeps the green phosphor inert or dark. Therefore, each color pixel on the CRT face has three separate binary numbers stored in corresponding bit positions in the three memories 7, 8 and 9. Logically, each color pixel has associated with it a corresponding bit position in the three memories.

The color image created at the CRT is made up of exactly 504 color pixels to a row repeated for exactly 336 rows. Each color separation image, i.e. the green, red and blue sets of color signals, is made up of about 300×500 or 150,000 bits. The total memory required for the three sets of color signals is 450,000 bits or 56.25 kilobytes. The normal memory capacity of CRT terminal 1 is adequate for energizing 500×500 color pixels which is 750,000 bits of 93.75 kilobytes. The memory in 7, 8 and 9 associated with the remaining 200 lines of color pixels is preferably used by the MPU 4 to simulate the color raster image with a monochrome raster image.

The CPU 10 creates color images represented by three sets of color signals each made up of about 2000×1300 bits. That is, the resolution of the image represented by the CPU color signals is about four times that of the CRT image of 500×300 pixels.

The MPU 4 is, for example, a Z80 microprocessor available from the Zilog Corporation of California whereas the CPU 10 is a Perkin-Elmer 3220 available from the Perkin-Elmer Corporation of Connecticut. The communications controller 11 itself can be a minicomputer such as a PDP 11/40 available from the Digital Equipment Corporation. The CPU is a size not only to cope with the higher resolution digital image but also with a plurality of images from the same or different CRT terminals.

The CPU 10 applies sets of green, red and blue signals to a camera device 12. The camera is available from the Celco Corporation under the tradename CELCO CFR 2000. The camera 12 includes a precision CRT 13, a color filter wheel 14, a lens means 15, film 16 and a film holding and indexing means represented by the film spools 17 and 18.

The face of the precision CRT 13 includes a phosphor that emits white light. The white image is projected sequentially onto the film 16 through green, red and blue transmission filters mounted about the periphery of color wheel 14. A film frame is first exposed to an image on the CRT 13 created by a set of 2000×1300 bits representing the green separation image with the green filter in the optical path. Without moving the film 16, a red filter on wheel 14 is moved into the optical path and a set of red signals energizes the CRT. The like procedure is followed by exposing the film to a blue separation image. The three sequential exposures of the film frame, not necessarily in the order stated, generate a latent image that, when photographically developed is a high resolution color image of the lower resolution image formed at the CRT terminal 1.

A black and white, i.e. monochrome, graphic print of the CRT is possible with the present invention which converts the color signals stored in memories 7, 8 and 9 to monochrome marking signals suited for the proof printer 22.

Figure 6:
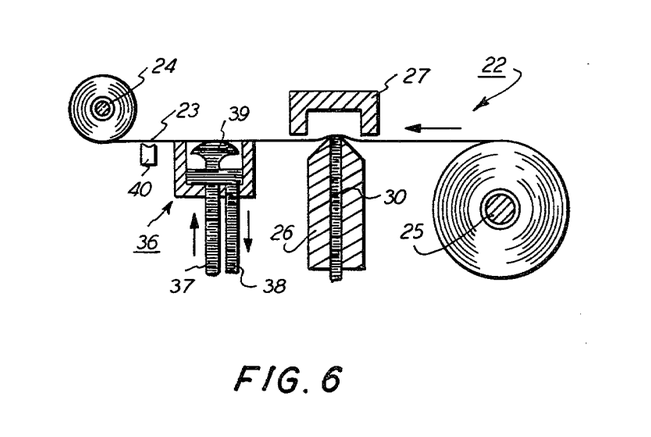
FIG. 6 is a schematic side elevation view of an electrostatic marking device or printer suited for use with the instant invention.
Figure 7:
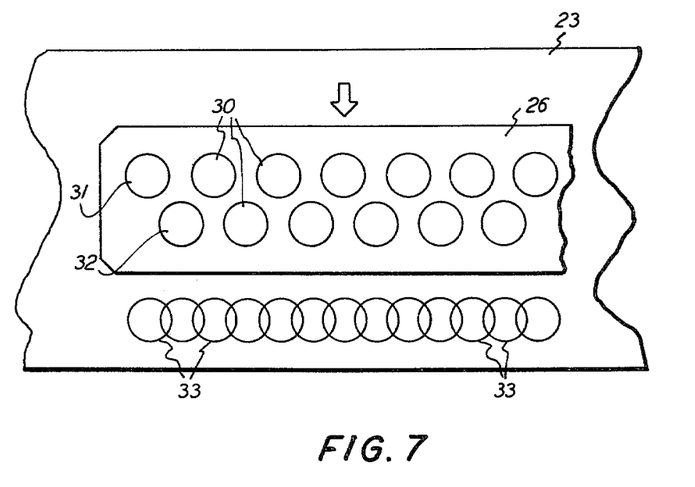
FIG. 7 is a schematic plan view of the electrostatic marking head shown in FIG. 6 and of the marking pattern (the monochrome pixels) made by the marking of recording head on the paper moved past the head.

Proof printer 22 is an electrostatic marking device. Referring to FIG. 6, a dielectric coated paper 23 is wound between spools 24 and 25. The spools are synchronously rotated to move the paper 23, i.e. the graphic medium, over the electrostatic recording head 26 and backing electrode 27 both of which are stationary. The recording head 26 includes a plurality of stylii 30 arranged in two rows 31 and 32 with one row shifted one half a stylus spacing relative to the other to increase the apparent packing density of the stylii. The overlapping circles 33 on the paper 23 represent a single row of charged spots addressable in a parallel writing fashion by the head 26. The parallel writing is done first by row 31 and then by row 32 after the paper moves a distance so that the electrostatic spots deposited by the first row are under the stylii in the second row. The printer 22 includes a microprocessor 35 (FIG. 1) that is the means for effecting the writing of the charged spots 33. (The Versatec 1200 Printer Plotter mentioned earlier is an example of a suitable printer 22 but it does not have a microprocessor. Rather, it uses hard wired circuits to provide the control functions of MPU 35.) In other words, MPU 35 applies marking signals to the stylii 33 in a manner to effect the facsimile of the color image at the CRT terminal 1. This is discussed further later in this description.

The electrostatic spots 33 are created from ionized air near the tip of a stylus when a large voltage is applied to a stylus in response to a marking signal. The binary one level of a marking signal causes the spot to be formed. The backing electrode 27 is electrically grounded and the electric field between the electrode 27 and the stylus tip causes the ionization of air in the vicinity of the tip. Multiple rows of electrostatic spots 33 collectively comprise a latent electrostatic raster scan image.

The latent electrostatic raster image on paper 23 is made visible by the developer means 36. Electrostatically charged toner particles are suspended in a dielectric liquid carrier pumped to and from the developer via the inlet and outlet pipes 37 and 38. The liquid is spread over the width of the paper 23 by a porous fountain member 39. The toner particles adhere to the electrostatic spots 33 thereby making the latent image visible. The vacuum channel holds the paper taughtly against the developer means and the print head. The excess liquid carrier and toner falls off the paper due to gravity. A hot air stream (not shown) is passed over the developed image by a blower to accelerate the drying and to fix or fuse the toner to the paper.

The paper 23 shown in FIG. 1 is a cut sheet taken from a continuous web of paper as shown in FIG. 6. The width of the paper is A4 size according to the 297×165 dimensions shown but other sizes are possible. In the example of the system of FIG. 1, the monochromatic graphic simulation of a color CRT image occupies an area of about 254×165 mm. The print head 26 needs to be at least 254 mm wide for this size image. The spots 33 (FIG. 7) are laid down at about 7.87 spots per millimeter (mm).

A black and white print made on paper 23 according to this invention simulates a color image displayed on the face of CRT 2. The terminal MPU 4 is the means for converting the color signals that produce the color display to the marking signals that produce the black and white copy. The black and white copy contains unique halftone dot patterns that identify to a viewer the different colors. In addition, the optical reflection density of a halftone pattern is related to the relative luminance of the color it simulates. Also, the edges between halftone patterns are highlighted to help distinguish one pattern—and therefore a color—from another. To understand how this is achieved turn to FIGS. 3a, 3b, 4, 5a, 5b and 5c.

Figure 3A:
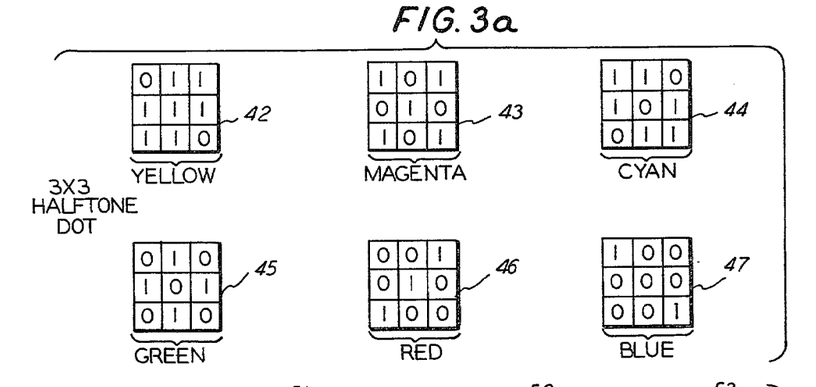
FIG. 3a is a layout of six 3×3 halftone dot patterns according to the present invention.

The six 3×3 squares in FIG. 3a represent six sets of marking or screen signals that meet the criteria of the present invention. That is, each set is made up of a unique bit pattern and the density of the one bits within each pattern is related to the relative luminance (or density) of eight color combinations possible with three constant tone primary colors of green, red and blue.

Figure 4:
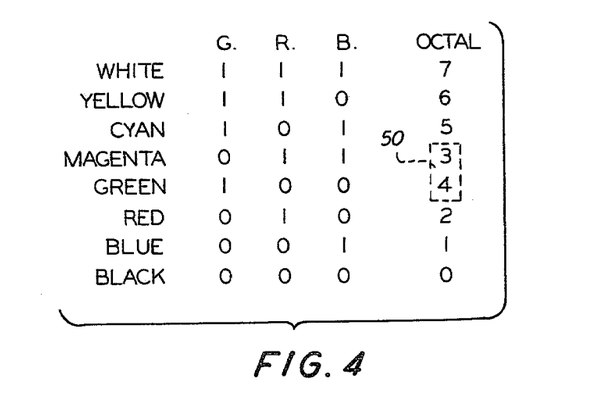
FIG. 4 is a table showing eight colors in descending order of luminance from white to black. The G, R and B symbols represent green, red and blue and the ones and zeroes are a truth table relating the eight colors that are available with constant luminance for green, red and blue light. The octal column gives the octal number for the binary numbers associated with the ones and zeros under the G, R and B symbols.

FIG. 4 sets forth in table form the ascending order of luminance (descending order of density) for the various combinations of emission of the green, red and blue regions of a color pixel on the face of the CRT 2. The headings G, R and B refer to green, red and blue light. A one (1) means a particular color light is being emitted and the zero (0) means it is not. The column with the octal heading shows the radix 8 number that is equivalent to the binary numbers in the table. The dashed line 50 is added to highlight that the luminance order of the color combinations matches the natural counting order except for the numbers 3 and 4 associated with magenta and green.

The definitions of yellow, cyan and magenta expressed in the table by the three bit binary numbers are conventional optical definitions. That is, conventionally, yellow is a combination of green and red, magenta of red and blue and cyan of green and blue.

The yellow, magenta and cyan sets 42, 43 and 44 of marking signals in FIG. 3 are in fact combinations of two of the three patterns 44, 45 and 46. White is a combination of all three patterns and black is logically a pattern of none of them, i.e. all zeroes. Note that the pattern for black contains all zeroes and for white all ones. The number of zeroes in a 3×3 set of marking signals 42–47 grows from two to seven by increments of one as one proceeds from white to black according to the order given in Table 4.

Figure 3B:
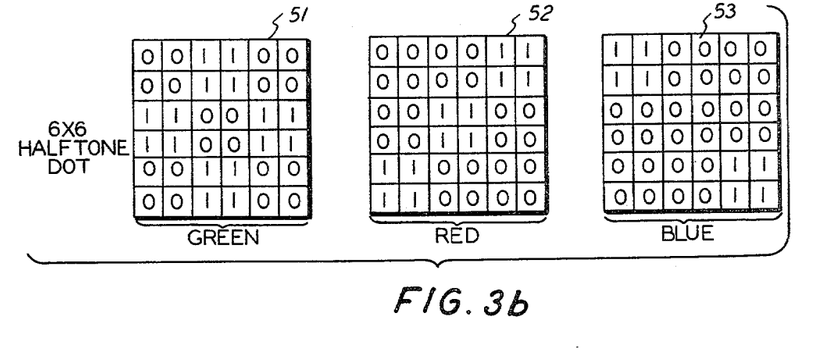

The printer 22 (FIGS. 1, 6 and 7) produces black marks on paper at spots 33, at about the density of 7.87 pixels per mm. The spots 33 are the monochrome pixels that simulate corresponding color pixels at the CRT 2. These monochrome pixels occur at a spatial frequency that is above the ability of a human eye to detect them readily. The 3×3 set of pixels shown in FIG. 3a when reproduced in the monochrome pixels have a spatial frequency of about 2.62 pixels or spots per mm which is still difficult for the eye to detect. However, if the 3×3 set is simply multiplied by 2 into the 6×6 sets as shown in FIG. 3b, the spatial frequency becomes about 1.31 pixels per mm which is easily detected by the eye. Consequently, the actual set of screen or marking signals to be used herein for the 7.82 pixel per mm graphic printer 22 is the 6×6 sets 51, 52, and 53. These three sets correspond in pattern to the 3×3 sets 45, 46 and 47. The 6×6 sets for yellow, magenta and cyan are readily envisioned by reference to sets 42, 43 and 44 and by duplicating each bit in both the x and y (pixel and row) axes.

Figure 5A:
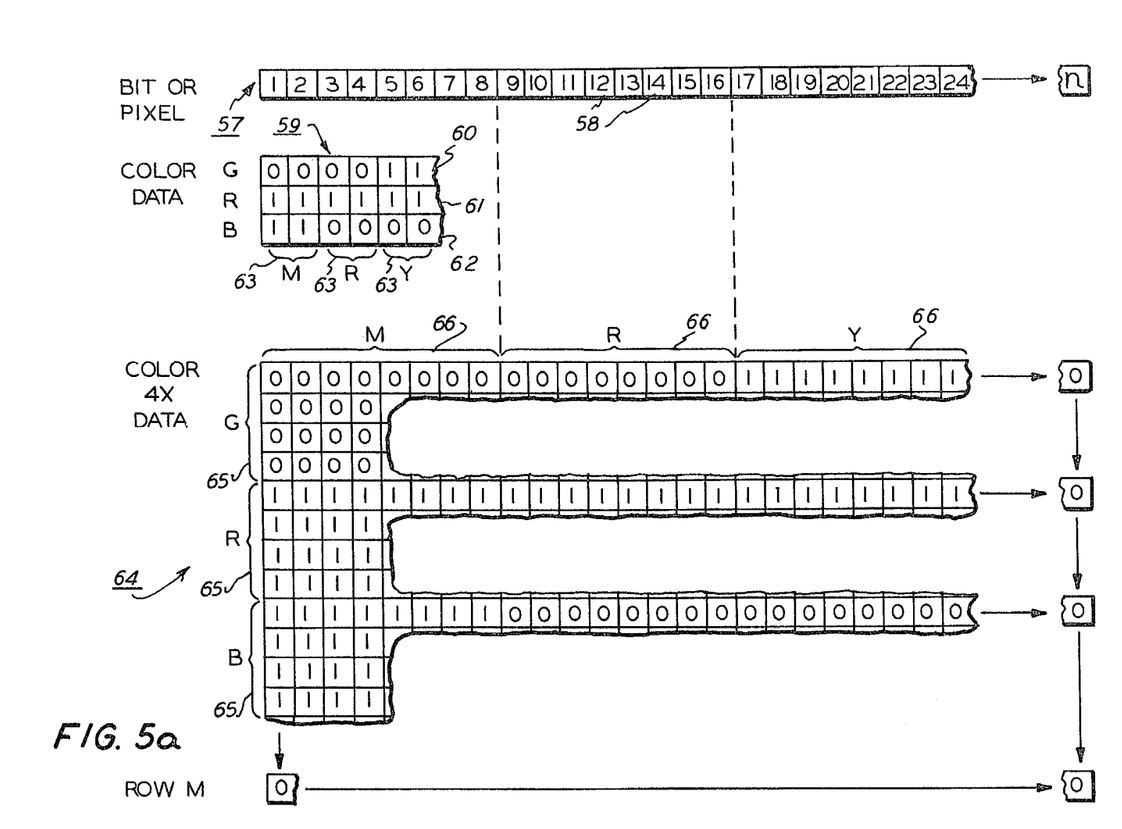
FIG. 5a is a schematic of the bit and pixel patterns associated with a color raster image before and after magnification by a factor of four.

Turning now to FIG. 5a, the top row 57 of small boxes 58 represents a row or line of data in the terminal and printer MPU's 4 and 35 memories containing the color and marking signals. Also, row 57 represent either a row of color pixels on the CRT 2 face or monochrome pixels on the paper 23 in the printer 22.

The green, red and blue sets of color signals contained in memories 7, 8 and 9 (FIG. 1) are logically associated to each other as indicated by the grouping 59. The row 60 is a row of bits from the green color signal memory 7 and rows 61 and 62 are corresponding rows from the red and blue memories 8 and 9. The combination of ones and zero from like bit positions in the three rows 60, 61 and 62 identify the color the CRT generates for each color pixel on the face of CRT 2. The bit pattern shown is arbitrarily selected for purposes of explanation. The brackets 63 indicate that the bit positions in group 59 represent 2 color pixels of magenta (m), red (r) and yellow (y).

According to this invention, a group of data 59 is first magnified as a preferred but optional step. The magnification is for scaling purposes but also for permitting edge enhancement without significant loss of data as will be explained in connection with FIG. 5b. The grouping 64 is the group 59 with the data repeated, i.e. magnified, four times in the x and y axes. The G, R, B brackets 65 identified the twelve rows of memory within memories 7, 8 and 9 that are needed to store the magnified data. The M, R and Y brackets 66 identify the colors of the data. As mentioned earlier, the CRT display image is created with only about 300 of the 500 rows of pixel or bit positions available in memories 7, 8 and 9 thereby making the remaining memory available for the simulation process. The entire 500×300 raster image stored in memory need not be modified at one time. The magnification is performed one row at a time for the green, red and blue sets of color signals or bits. The magnified data, i.e. group 64 is stored into sixteen rows of memory (four rows for each set of color signals).

The terminal MPU 4 performs the multiplication. It inspects four bits (a nibble) of data within a row, e.g. the green row 60, and inserts the contents of a sixteen bit long word in a look up table addressed by the nibble into the corresponding sixteen bit positions in the memory allocated for the four green lines identified by bracket 65G. Like operations are performed on data rows 61 and 62.

Figure 5B:
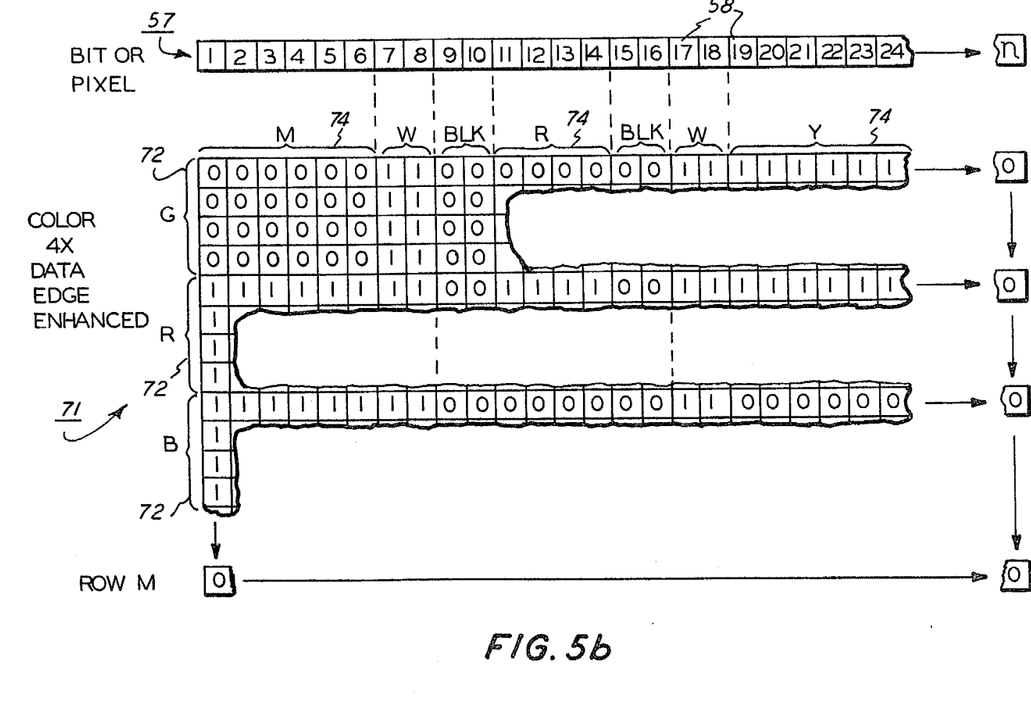
FIG. 5b is a schematic of the 4× color raster image data in FIG. 5a with the edges or tansitions between colors enhanced, i.e. set to black or white.

FIG. 5b also shows the reference row 57 of pixels or bits 58. Data group 71 with its twelve rows of data identified by the G, R and B brackets 72 is the same as the data group 64 in FIG. 5b but with the transitions or edges between colors changed to enhance their appearance in the monochrome copy. The edge enhancement step is performed by the terminal MPU 4 during or after the magnification process is completed. An edge, i.e. a transition from one color to another, is detected by testing the bit pattern associated with a color pixel against the previous bit pattern. If it is different, an edge is present. If the previous number is larger the change is from a lighter to a darker color and if smaller the inverse. This is apparent from an inspection of the listing in FIG. 4 except for a change from magenta to green or green to magenta. An additional test is performed by MPU 4 when these magenta, green edges are involved but this time the rule is reversed.

The MPU 4 forces the bit pattern to all ones (white) or all zeroes (black) on either side of the edge to enhance the appearance of the edge in the final monochrome print. In group 71, two bit positions are forced to ones and zeroes on each side of the edges. (Obviously, no enhancement is performed if the transition is from black to white or vice versa because it isn't needed.) The double 1 and double 0 bit patterns (1100 and 0011) are stored in a two location look up table and the correct pattern is inserted into all twelve rows holding the 4× data at each identified edge as shown in FIG. 5b.

FIG. 5c once again shows the row 57 of pixels or bits 58 to illustrate the physical and logical relationship of the data shown in FIG. 5C. The row of data 73 is not actually generated but is shown as a short hand representation of data group 71. Data row 73 is obtained by "anding" the green, red and blue data bits associated with each color pixel in group 71. The M, W, BLK and Y brackets 74 are the same as those for group 71 and identify the color of the different bit regions. The zeroes in the "anded" data row 73 identify the pixel location in a given row of monochrome pixels that receive black and white marks in a halftone pattern and the ones identify the white only pixel locations.

Figure 5C:
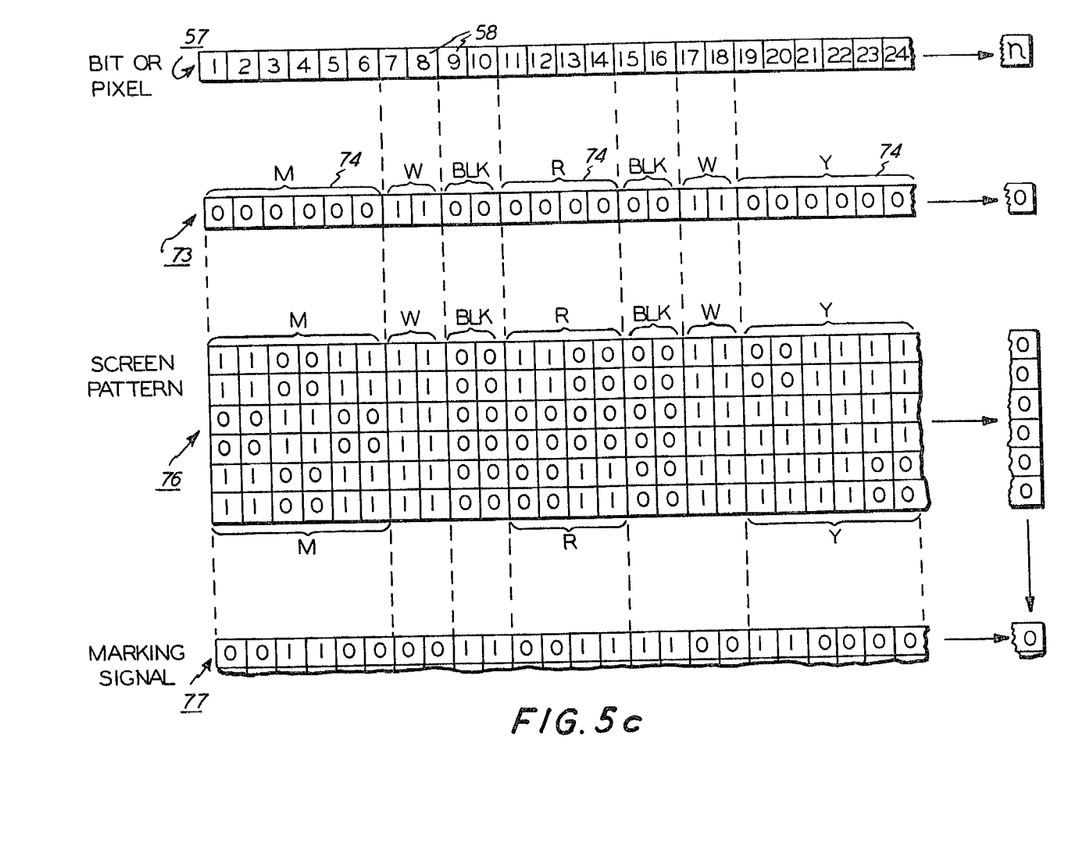
FIG. 5c is a schematic of the 4×, edge enhanced data of FIG. 5b halftone screened by 6×6 halftone dots with patterns corresponding to those in FIG. 3. The inverse of the screened signals are the monochrome marking signals or data.

Data group 76 represents six rows of monochrome bits or marking signals, or more correctly, screen signals. Screen signals are those of the halftone dot patterns of FIG. 3b and are simply the inverse of the actual marking signals. The inversion is involved because the one bit in the CRT terminal turns "on" a green, red or blue phospher region of a color pixel causing it to emit light. In contrast, the one bit in the proof printer 22 causes a black spot to be placed on white paper. The row of data 77 is the inverse of the top row of data in group 76. Therefore, the data in row 77 represent the actual marking signals applied to printer 22.

The screen signals of group 76 are generated by the terminal MPU 4 by executing Boolean algebra on the various described signals. The specific logic equation used by MPU 4 is:

$$G(b) \cdot GS(k) + R(b) \cdot RS(K) + B(b) \cdot BS(k) = S = \overline{M} \quad \text{Equation (1)}$$

wherein
 S is the one bit binary number representing the screen signals or data in Group 76;
 M is the marking signal represented by the marking signals or data in row 77 and is the inverse of S;
 G(b), R(b) and B(b) are respectively the green, red and blue color signals associated with the regions within brackets 72G, 72R and 72B of group 71 in FIG. 5b;
 b represents the bit position of the data in a row as indicated by row 57 in FIGS. 5a, b and c;
 GS(k), RS(k) and BS(k) are respectively the green, red and blue screen signals associated with the halftone dots 51, 52 and 53 in FIG. 3b;
 k is the bit address within a row of screens 51, 52 or 53 in FIG. 3b and is an integer having a value of 1 through 6.

The above logic equation (1) operates on data in like rows, one row at a time. The four rows of magnified, edge enhanced data of group 71 are stored in a portion of MPU 4 memory. The sets of screen (or marking) signals 51, 52 and 53 are also stored in the memory in a six bit row by six row format. It is not necessary to store screen signals for yellow, magenta and cyan screen signals because those patterns are generated by the "or" (+) operation of equation (1). (The dot symbol in equation (1) represents the "and" operation.)

The operation of equation (1) is readily understood by referring to the top row of data in group 76 in FIG. 5c. The "one" in the first bit position of the top row is obtained by inserting the following values into equation (1):
 $G(b) = G(1) = 0$ (false) as determined by the zero bit in the first bit position (b) of the first of the four rows of green data identified by bracketed 72G in FIG. 5b;
 $GS(k) = GS(1) = 0$ as determined by the zero bit in the first bit position (k) of the first of six rows of green screen data identified by the 6×6 matrix 51 in FIG. 3b;
 $R(b) = R(1) = 1$ (true) as determined by the one bit in the first bit position (b) of the first of four rows of red data identified by bracket 72R in FIG. 5b;
 $RS(k) = RS(1) = 0$ as determined by the zero bit in the first position (k) of the first of six rows of red screen data identified by the 6×6 matrix 52 in FIG. 3b;
 $B(b) = B(1) = 1$ as determined by the one bit in the first bit position (b) of the first of four rows of blue data identified by bracket 72B in FIG. 5b; and
 $BS(k) = BS(1) = 1$ as determined by the one bit in the first bit position (k) of the first of six rows of blue screen data identified by the 6×6 matrix 52 in FIG. 3b.

From the above values, equation (1) may be expressed as, $$0.0 + 0.1 + 1.1 = 1 = S.$$

$S = 1$ is therefore the value appearing in the first bit position in the top row of group 76 in FIG. 1. Continuing the application of equation (1) to the rest of the color data bits from the identified row 57 through b=24 and recycling the top rows of screens 51, 52 and 53 in FIG. 3b yields the balance of the bit pattern in the top row of group 76. The second and subsequent rows of group 76 are generated in like manner by applying equation (1) to the subsequent rows of color data in group 71 of FIG. 5b and the subsequent rows of screen data in matrices 51, 52 and 53 in FIG. 3b. The rows of screen signals are recycled from top to bottom starting with the seventh row.

Group 76 in FIG. 5c includes six rows of screen data whereas group 71 of color data in FIG. 5b includes only four rows of green, red and blue color data. The fifth and sixth rows in group 76 are obtained by applying equation (1) to fifth and sixth rows of color data identical to the color data in group 71. (The four rows of data for green, red and blue in group 71 are identical because of the magnification step as explained in connection with FIG. 5a.)

Equation (1) always operates to set a bit euqal to one when the color data is "white" because all the color data bits are equal to one and at least one of the screen bits is always equal to one regardless which row of the screens are being used.

Equation (1) always operates to set a bit equal to zero when the color data is "black" because all the color data bits are equal to zero. This fact forces all the "and" products to zero which in turn sets the value of S equal to zero.

MPU 4 inverts S to generate the marking signal M applied to the printer 22. The row 77 in FIG. 5b is the top row of group 76 inverted.

The marking data or signals, e.g. that in row 77, are loaded a byte at a time into buffers in the printer MPU 35 under the supervision of MPU 35. The MPU 35 in turn appropriately applies the marking signals (row 77) to the stylii 30 to create the monochrome image that simulates the color image on the display face of CRT 2.

The above description of how equation (1) generates the data in group 76 included a fairly simple means for generating the values for the parameters GS(k), RS(k) and BS(k), i.e. the screen signals. MPU 4 starts the values of the halftone dots 51, 52 and 53 in its memory and continuously cycles a row of bits from each screen through an entire row of data. The rows in the screens are cycled from top to bottom synchronously with the processing of each new row of color data in sequence. This screen signal generating process is practical because the halftone dots are comparatively small, the screen values are binary numbers and the screen angle is zero. In more complex systems, alternate methods of generating the screen signals are provided by the screen generators described by Thomas M. Holladay in U.S. Pat. Nos. 4,149,194 and 4,185,304. The disclosures of those patents are hereby expressly incorporated by reference.

The Holladay screen generators are particularly suited for generating angled screens. The same halftone dot pattern at a different angle is sometimes more attractive or more distinguishable from other patterns in given applications.

Broadly, the Holladay screen generators produce the bit patterns for the rows in an angled screen by cycling repetitive bit combinations found in different rows and by shifting and changing the bit combinations from row to row in a prescribed manner. The generators are able to produce significantly complex screen patterns while using a comparatively small amount of memory and logic functions.

The foregoing specification and drawings suggest many changes, modifications and enhancements to the described specific embodiments. The scope of this invention is intended to encompass such variations of this invention.

I claim:

1. A method of simulating an electronic polychrome raster image represented by color signals with an electronic monochrome raster image represented by marking signals comprising
    providing multiple sets of screen signals with each set defining unique halftone dot patterns for different colors represented by the color signals and
    generating marking signals from the color signals and screen signals that simulate different colors in the polychrome raster image with the unique halftone dot patterns of the screen signals.

2. The method of claim 1 wherein each set of screen signals defines a halftone dot pattern that has a comparative density related to the comparative luminance of different colors in a polychrome raster image.

3. The method of claim 1 wherein each set of screen signals defines a halftone dot pattern having a spatial frequency readily detectable by the human eye when converted to marks on a graphic medium.

4. The method of claim 1 wherein each set of screen signals defines a halftone dot pattern having a spatial frequency readily detectable by the human eye when converted to marks on a graphic medium and wherein each set of screen signals defines a halftone dot pattern that has a comparative density related to the comparative luminance of different colors in a polychrome image.

5. The method of claim 1 further including the step of enhancing the appearance of edges between halftone patterns represented by the marking signals by changing the portion of the halftone dot pattern adjacent the edges.

6. The method of claim 5 including the step of magnifying the color signals representative of the polychrome image prior to generating the marking signals from the color and screen signals and enhancing the edges to minimize the loss of color information in the monochrome raster image.

7. The method of claim 1 wherein color signals include at least first and second sets of color signals with each set representative of a single color and with the combination of the two representative of a third color and wherein at least first and second sets of screen signals represent the two colors represented by each set of color signals and the combination of the two sets of screen signals represent the third color represented by the combination of the two sets of color signals.

8. The method of claim 7 wherein green, red and blue sets of color signals represent green, red and blue colors in a polychrome raster image and wherein green, red and blue sets of screen signals represent the green, red and blue color signals in a monochrome raster image.

9. The method of claim 8 wherein the step of generating the marking signals from the color signals and the screen signals includes relating the two signals according to the Boolean algebra expression $$G(b).GS(k)+R(b).RS(k)+B(b).BS(k)=M$$

wherein the dot is a logical and operator and the plus is a logical or operator,
    G(b), R(b) and B(b) are corresponding color signals from the green, red and blue sets of color signals repsectively with b defining the locations within each set, GS(k), RS(k) and BS(k) are corresponding screen signals from the green, red and blue sets of screen signals respectively with k defining the locations within each set and M defines the marking signal or the logical inverse of the marking signal.

10. The method of claim 9 wherein the green, red and blue color signals are the color signals associated with a polychrome raster display image created on color display means and further including the step of coupling the marking signals to graphic printing means to generate a graphic monochrome raster image of the polychrome raster image.

11. The method of claim 10 wherein the color display means includes a color CRT display device and wherein said printing means creates the monochrome image by creating monochrome visible marks on paper.

12. The method of claim 10 wherein the printing means includes an electrostatic printer having at least one row of stylii adapted to mark a graphic medium in response to the marking signals to form a latent electrostatic raster image.

13. The method of claim 1 further including the steps of creating a 35 mm color slide from signals derived from the color signals representative of the polychrome raster image and the step of applying the marking signals to monochrome printing means to create a monochrome facsimile of the 35 mm color slide to verify the composition of the color slide.

14. The method of claim 1 wherein halftone dot patterns have zero screen angles.

15. The method of claim 1 wherein the halftone dot patterns have non-zero screen angles.

16. The method of claim 1 wherein the screen signals define nonzero angle halftone dot patterns generated by cycling and shifting screen signals.

17. Apparatus for generating a monochrome raster scan graphic image of a polychrome raster scan image created on the face of a polychrome CRT comprising storage means for storing multiple sets of color signals for energizing different color regions in color pixels arranged in a plurality of rows at the face of the CRT for emitting different colors of light when energized by an electron beam to create a polychrome raster scan image on the face of the CRT, generator means for generating multiple sets on screen signals corresponding to the multiple sets of color signals for creating different pattens in areas in the monochrome raster scan graphic image that correspond to different color areas in the polychrome raster scan image, microprocessor means for combining the color signals and screen signals to generate a single set of marking signals representative of a raster image having monochrome pixels corresponding to the color pixels at the face of the CRT and printing means coupled to receive the marking signals to generate visible monochrome marks on a graphic medium to form a monochrome raster scan graphic image wherein different patterns associated with the screen signals represent colors in the polychrome raster scan image at the face of the CRT.

18. The apparatus of claim 17 further including a 35 mm color slide camera means for generating 35 mm color slides of polychrome images of the polychrome raster scan image created on the face of the CRT after a monochrome graphic image has been created on the printing means to verify the composition of the polychrome image.

* * * * *